United States Patent [19]
Wheeler

[11] Patent Number: 4,778,992
[45] Date of Patent: Oct. 18, 1988

[54] DOSIMETER FOR RADON AND RADON DAUGHTER PRODUCTS

[75] Inventor: Robert V. Wheeler, Lemont, Ill.

[73] Assignee: Tech/Ops, Inc., Boston, Mass.

[21] Appl. No.: 12,266

[22] Filed: Feb. 9, 1987

[51] Int. Cl.[4] ........................... G01T 5/00; G01T 1/02
[52] U.S. Cl. .................................. 250/255; 250/253; 250/472.1
[58] Field of Search ................. 250/255, 253, 472.1, 250/482.1, 475.2, 474.1, 473.1

[56] References Cited

U.S. PATENT DOCUMENTS

| | | | |
|---|---|---|---|
| 3,505,523 | 4/1970 | Becker | 250/473.1 |
| 3,665,194 | 5/1972 | Alter et al. | 250/253 |
| 3,783,292 | 1/1974 | Alter et al. | 250/475.2 |
| 4,064,436 | 12/1977 | Ward, III | 250/253 |
| 4,238,684 | 12/1980 | Seidel | 250/484.1 |
| 4,297,574 | 10/1981 | Card et al. | 250/253 |
| 4,338,523 | 7/1982 | Alter | 250/472.1 |
| 4,385,236 | 5/1983 | Hassib et al. | 250/472.1 |
| 4,518,860 | 5/1985 | Alter et al. | 250/253 |

OTHER PUBLICATIONS

M. Urban and E. Piesch, "Low Level Environmental Radon Dosimetry with a Passive Track Etch Detector Device", *Radiation Protection Dosimetry*, vol. 1, No. 2, (1981), pp. 97-109.
Chruscielewski et al., "The Performance of Passive Differentiating Track Detectors Containing a Diffusion Barrier", *Radiation Protection Dosimetry*, vol. 2, No. 1, pp. 27-32.
Urban, M., "Passive One-Element Track Etch Dosemeter for Simultaneous Measurement of Radon, Thoron and Decay Products in Air", *Nuclear Tracks*, vol. 12, Nos. 1-6, pp. 685-688, 1986.
Frank et al., "Properties of a Small Radon Diffusion Chamber with Plastic Track Detectors", *Solid State Nuclear Track Detectors*, Pergamon Press 1982, pp. 531-534.
Frank et al., "Radon Dosimetry Using Plastic Nuclear Track Detectors", *Nuclear Track Detection*, vol. 1, No. 3/4, pp. 149-179, Pergamon Press, 1977.

*Primary Examiner*—Janice A. Howell
*Assistant Examiner*—Constantine Hannaher
*Attorney, Agent, or Firm*—Trexler, Bushnell, Giangiorgi & Blackstone Ltd.

[57] ABSTRACT

An improved radon detector has an enclosed housing with a removeable cap to provide a chamber within which a detector member is mounted for detecting the impact of alpha particle emissions from radon gas entering the chamber through apertures formed in the cap. The detector member has at least one planar surface for detecting the emissions and is supported within the chamber to orient the planar detection surface in a generally vertical plane parallel to the central axis of the upstanding enclosed wall which positions the detection surface in parallel opposition to preferably the major portion of the enclosing wall on which radioactive decay products from radon are deposited.

11 Claims, 1 Drawing Sheet

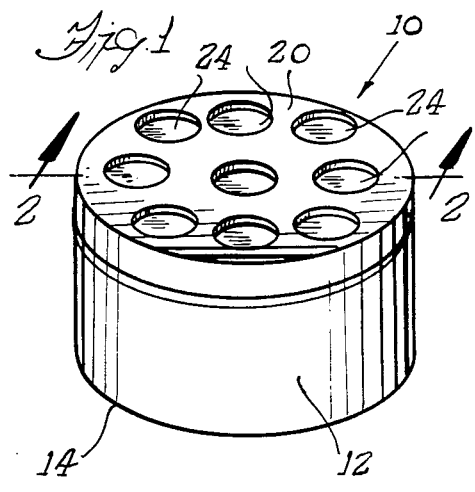
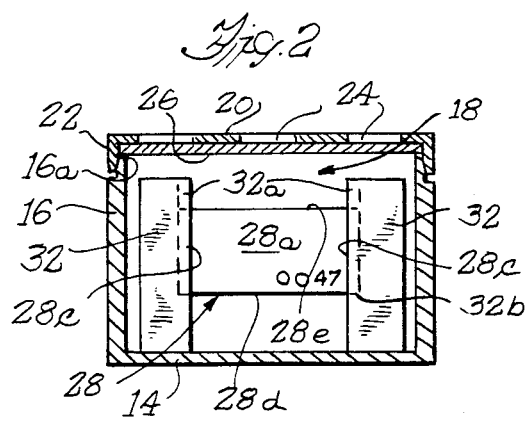
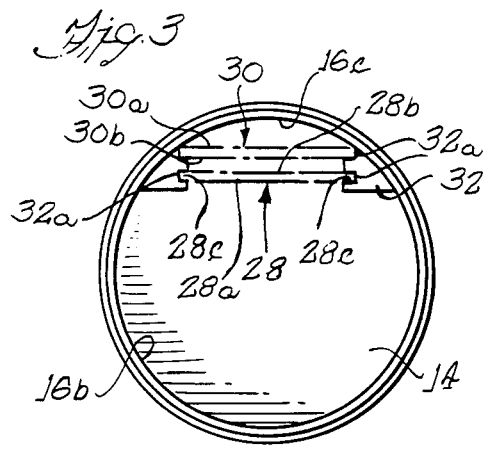
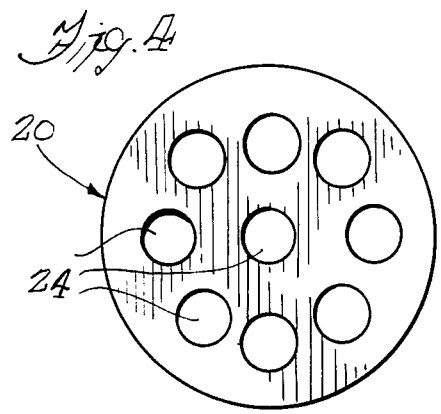
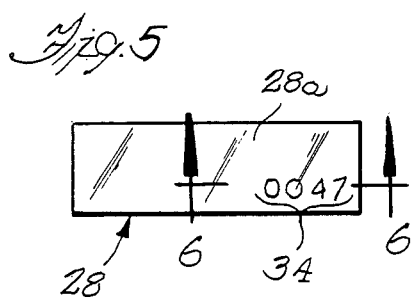
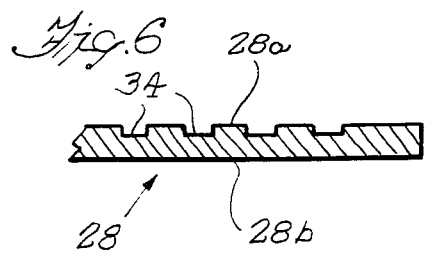

DOSIMETER FOR RADON AND RADON DAUGHTER PRODUCTS

BACKGROUND OF THE INVENTION

This invention relates to device for detection of radon gas employing a detector material which records the impact of alpha particles emitted by radon and derived radioactive decay products. More particularly, this invention is an improvement of the compact radon detector described in U.S. Pat. No. 4,518,860 which is incorporated by reference herein for extensive discussion of radon detection. In general, the objective of this invention is to provide not only an effective device for detection of radon, but in addition to provide a radon detector which is dimensioned for convenient personal use as well as in permanent installations.

SUMMARY OF THE INVENTION

In accordance with this invention, the improved radon detector has an enclosed housing with a removeable cap to provide a chamber within which a detector member is mounted for detecting the impact of alpha particle emissions from radon gas entering the chamber through apertures formed in the cap. The detector member has at least one planar surface for detecting the emissions and is supported within the chamber to orient the planar detection surface in a generally vertical plane parallel to the central axis of the upstanding enclosing wall which positions the detection surface in parallel opposition to preferably the major portion of the enclosing wall on which radioactive decay products from radon are deposited.

In a preferred embodiment, the detector members are strips with a rectangular configuration and the housing has a cylindrical sidewall within which the detector strip is mounted so that the length of the rectangular planar surface is aligned along a chord of the circular cross section of the cylindrical wall. Preferably the planar surface is offset with respect to the central axis of the cylindrical wall so that the detection surface is positioned in generally parallel opposition to the larger portion of the surface of the cylindrical wall in relation to the reverse surface of the detector strip.

In a particularly preferred embodiment, two detector strips are mounted in parallel and the primary detector surfaces of the respective strips are faced away from one another to provide comparative exposure to both the larger and the smaller portions of the cylindrical wall surface. Each of the detector strips is vertically centered within the chamber by supporting flanges which are spaced and project radially inwardly to seat the opposing ends of the detector strips.

BRIEF DESCRIPTION OF THE DRAWING

FIG. 1 is a perspective view of an embodiment of the radon detector of the invention;

FIG. 2 is a sectional view taken along line 2—2 in FIG. 1 and in the indicated direction, illustrating the vertical centering of a detector strip supported within the housing of the detector;

FIG. 3 is a top plan view of the detector of FIG. 1 with the apertured cap removed to illustrate two detector strips positioned offset with respect to the central axis of the detector housing;

FIG. 4 is a top plan view of the apertured cap on the detector of FIG. 1;

FIG. 5 is the top plan view of the detector strip of FIG. 2 illustrating an identification number engraved into the sensitive detection surface of the strip; and FIG. 6 is a sectional view taken along line 6—6 in FIG. 5 and in the indicated direction.

DESCRIPTION OF THE PREFERRED EMBODIMENT

Referring to FIGS. 1 and 2, an embodiment of the radon detector of the invention is generally designated by reference character 10. The detector 10 includes a cup-shaped housing 12 defined by a basewall 14 and a cylindrical wall 16 upstanding from the base 14 to form a chamber 18 therein. A removeable cap 20 covers the mouth formed by the open, upper end of the wall 16 to fully enclose the chamber 18. The cap 20 has a depending peripheral skirt 22 which snaps into an annular groove 16a laterally formed in the upper end of the wall 16. The cap has a plurality of through apertures 24 and the lower surface of the cap is covered by a filter member which blocks particulate material and radon daughter products from entering the chamber 18 but allows passage of gases including radon gas entering through the apertures 24. The filter medium 26 can have an average pore size, for example 0.04 to about 0.2 micrometer as more fully described in the aforementioned U.S. Pat. No. 4,518,860.

Referring to FIGS. 2 and 3, mounted within the chamber 18 are one or more detector strips 28 and 30 which register the impact of alpha particles emitted both from radioactive Rn 222 gas which enters the chamber 18 through the apertures 24, as well as those alpha particles emitted by the radioactive radon decay or daughter products Po 218 and Po 214 which are deposited on the interior surface of the housing 12 (particularly wall 16) and are derived from the entering radon gas. The detector strips 28 can be fabricated from conventional material which registers alpha particle impact, for example cross-linked poly (allylglycol carbonate) such as the polymeric material designated CR-39 commercially available from PPG Industries.

In the illustrated embodiment of the detector assembly 10, each of the detector strips 28 and 30 has a rectangular configuration having dimensions, for example, of approximately 1×3 cm. In order to orient the strips 28 for maximum exposure to the decayed products deposited on the cylindrical wall 16, the strips 28 are supported on edge so that the opposing planar surfaces 28a and 28b of the strip 28 are vertically aligned parallel to the central axis of the cylindrical wall 16 which positions the surfaces 28a and 28b in generally direct opposing relation to the curved interior surface of the wall 16 on which the decay products are deposited.

The conventional operation for casting the strip 28 (and 30) produces a smooth surface 28a and an opposing rougher surface 28b. Consequently, as shown in FIG. 3, the smoother surface 28a is located for greater exposure to the interior, curved surface of the wall 16 than surface 28b, and therefore the strips 28 and 30 are oriented along parallel chords of the circular cross section of the cylindrical wall 16 and offset from the central axis of wall 16. Thus, the smooth surface 28a which is exposed to the larger portion 16b of the surface of wall 16 and therefore higher density of alpha particle impacts from deposited daughter products is the surface which will be etched for development and counting of particle tracks. In order to provide comparative counting, the smooth side 30a of the strip 30 is positioned so that it is directed away from the strip 28 and in opposing relation to the smaller 16c of the curved portions of the wall 16. However, the second strip 30 can be entirely omitted.

Referring again to FIGS. 2 and 3, the strip 28 (and similarly the strip 30) is supported within the chamber 18 so that the opposing end edges 28c along its width are seated upon a pair of spaced, internal support flanges 32 which project radially inwardly from the wall 16 and are upstanding from the base 14, The strip edges 28c are press-fit into respective, vertical grooves 32a formed into the radially inner edges of the respective flanges 32; grooves 32a open at the upper ends of the respective flanges 32 to allow insertion of the strip ends 28c downwardly into the grooves 32a. As shown in FIG. 2, the grooves 32a do not extend to the base 14 and therefore a stop or ledge 32b is formed at each of the respective lower ends of the grooves 32a. The lower corners of the respective strip edges 28c are seated on the respective stops 32b so that the strip 28 (and similarly strip 30) is elevated from the base 14. Preferably, the distance B between the lower, lengthwise strip edge 28d and the base 14 is approximately equal to the distance A between the upper strip edge 28e and the filter 26 at the bottom of the cap 20 so that the strip 28 is vertically centered within the chamber 18 in order to promote repeatable strip geometry and accurate calibration. With suitable modification in the supportive flanging, the strips 28 and 30 could be mounted in generally vertical orientation with the longer, rectangular dimension aligned vertically and strips positioned "on end".

Referring to FIGS. 5 and 6, the strip surface 28a which is intended for primary exposure and track development is engraved with identification, preferably employing laser engraving in order to provide durable and readily apparent distinction from the less desirable strip surface 28b so that strip 28 is correctly inserted for the respective surface exposures. While the strip is normally inserted to position the smooth, engraved surface 28a for exposure to the larger portion of the surface wall 16 with respect to the exposure of surface 28b, under conditions of very high radon concentration, it may be desirable to reverse the surface exposures or to develop the less exposed surface. In order to suppress detection of background emission not derived from radon gas entering the chamber 18 through the cap 20, the housing 12, including flanges 32, is integrally molded from a plastic such as polyethylene.

While a preferred embodiment of the present invention is illustrated and described, it is envisioned that those skilled in the art may devise various modifications once possessed of this disclosure. Accordingly, the invention is to be defined by the spirit and scope of the claims appended hereto, and is not limited to the specific embodiment described.

The invention is claimed as follows:

1. A detector for radon gas and radioactive decay products derived from radon gas, comprising: a housing including a bottom wall and an enclosing wall upstanding therefrom to provide a chamber having an open mouth at an upper end of the enclosing wall; a removable cap closing said mouth, said cap being through-apertured to enable entry of radon gas into said chamber; at least one detector member mounted within said chamber, said member having at least one planar surface for detecting the impact of alpha particle emissions from said radon and radioactive decay products; and support means for mounting said detector member within said chamber to orient said planar surface in a generally vertical plane parallel to the central axis of the upstanding enclosing wall, so that said planar surface opposes at least a portion of said enclosing wall and registers alpha particles emitted by radon decay products deposited on said enclosing wall.

2. The detector according to claim 1 wherein said support means positions said planar surface elevated from said bottom wall.

3. The detector according to claim 2 wherein said support means positions said planar surface in generally vertically centered location with respect to said cap and said bottom wall.

4. The detector according to claim 1 wherein said support means comprises a pair of spaced support flanges projecting radially inwardly from said enclosing wall so that said planar surface is positioned between said flanges.

5. The detector according to claim 4 wherein said detector member comprises a generally rectangular strip having peripheral edges formed on opposing ends of said parallel surface and wherein each of said strip ends is supported on a respective one of said flanges.

6. The detector according to claim 5 wherein each of said flanges includes a peripheral groove within which said respective strip end is seated.

7. The detector according to claim 1 wherein said enclosing wall has a cylindrical configuration.

8. The detector according to claim 7 wherein said support means positions said planar surface offset from said central axis to align said planar surface along a chord of the circular cross section of said cylindrical wall, in order to expose said planar surface in general opposition to an asymmetrically larger portion of said cylindrical wall.

9. The detector according to claim 7 wherein the detector member comprises a generally rectangular strip including peripheral edges formed at opposing ends of said planar surface, and wherein said support means comprises a pair of spaced support flanges radially inwardly projecting from said cylindrical wall, said planar surface ends being supported by a respective one of said flanges to position said planar surface therebetween.

10. The detector according to claim 1 further comprising filter means for blocking passage of particulate matter or extraneous radon decay products into said chamber from said apertured cap.

11. The detector according to claim 6 wherein said strip ends are frictionally fitted into said respective flange grooves.

* * * * *